(12) United States Patent
Griffin et al.

(10) Patent No.: US 7,522,653 B2
(45) Date of Patent: Apr. 21, 2009

(54) SYSTEM AND METHOD FOR PN CORRELATION AND SYMBOL SYNCHRONIZATION

(75) Inventors: Dan M. Griffin, Bountiful, UT (US); Richard B. Ertel, Sandy, UT (US); Johnny M. Harris, Centerville, UT (US); Kenneth C. Bark, West Jordan, UT (US); Zachary C. Bagley, Salt Lake City, UT (US)

(73) Assignee: L-3 Communications, Corp., New York, NY (US)

( * ) Notice: Subject to any disclaimer, the term of this patent is extended or adjusted under 35 U.S.C. 154(b) by 773 days.

(21) Appl. No.: 11/046,361

(22) Filed: Jan. 27, 2005

(65) Prior Publication Data

US 2006/0165157 A1 Jul. 27, 2006

(51) Int. Cl.
*H04B 1/00* (2006.01)
(52) U.S. Cl. ........................... 375/147; 375/136
(58) Field of Classification Search ............... 375/147, 375/136, 150, 152, 149
See application file for complete search history.

(56) References Cited

U.S. PATENT DOCUMENTS

| | | | | |
|---|---|---|---|---|
| 5,577,025 A | * | 11/1996 | Skinner et al. | 370/209 |
| 5,872,776 A | * | 2/1999 | Yang | 370/342 |
| 6,237,013 B1 | | 5/2001 | Usui | |
| 6,493,376 B1 | * | 12/2002 | Harms et al. | 375/130 |
| 6,567,461 B1 | * | 5/2003 | Moon et al. | 375/145 |
| 6,647,056 B1 | | 11/2003 | Imaizumi et al. | |
| 6,678,313 B1 | | 1/2004 | Imaizumi et al. | |
| 6,850,507 B1 | * | 2/2005 | Ok | 370/335 |
| 2001/0004377 A1 | * | 6/2001 | Lee et al. | 375/141 |

* cited by examiner

*Primary Examiner*—Emmanuel Bayard
(74) *Attorney, Agent, or Firm*—Kirton & McConkie; William T. Ralston (57) ABSTRACT

A method is disclosed for PN correlation and symbol synchronization of a spread spectrum signal at a receiver when a symbol boundary of the spread spectrum signal is not on a PN epoch or is otherwise unknown. The method includes the operation of modulating the spread spectrum signal with a PN code to form a potentially despread signal. The potentially despread signal can be integrated for a plurality of symbol times at a rate of N integrations per symbol time to form N symbol energies per symbol for a plurality of symbols. Each of the N symbol energies can correspond to a different symbol time hypothesis. The N symbol energies from the plurality of symbols can be added respectively to form N summed symbol time hypotheses. The Nth summed symbol time hypothesis having maximum power can be found. The Nth summed symbol time hypothesis can relate to a location of the symbol boundary.

40 Claims, 7 Drawing Sheets

SYSTEM AND METHOD FOR PN CORRELATION AND SYMBOL SYNCHRONIZATION

FIELD OF THE INVENTION

The present invention relates generally to the transmission and reception of data in spread spectrum systems, and more particularly to improvements in PN code alignment and symbol synchronization.

BACKGROUND

For security and other reasons, a modulated carrier signal may be subject to spread spectrum modulation. A spread spectrum signal is spread over a wide bandwidth and is relatively immune to eavesdropping and jamming. One technique uses a pseudo-random (PN) code sequence to obtain the desired spectral spreading. A PN sequence is a binary sequence that repeats itself after a large number of cycles. Thus, the binary numbers in the sequence are not truly random, but if the repetition cycle of the sequence is long enough its spectrum shares many of the properties of random electromagnetic noise. In the context of a data transmitter, PN modulation may be applied to a modulated carrier signal by simply passing the data stream and the PN code sequence through an exclusive OR gate, to achieve phase shift key (PSK) modulation of the data onto the PN code. Data bits are either inverted or not, depending on the presence or absence of a logical "1" bit in the PN code. The data symbol rate is typically many times slower than the PN code rate (referred to as the PN "chip" rate). The resulting digital data stream is a PN code modulated by the slower data symbol stream and is used to modulate a carrier signal in accordance with a digital modulation technique, such as PSK. The modulated carrier can then be transmitted.

In order to recover the data from the spread spectrum signal described above, two steps must occur. First, the PN code of the transmitted signal must be correlated with the matching, locally generated PN codes at the receiver. Second, the digital receiver needs to have its demodulator synchronized to the digital symbol transitions of the transmitted data symbol stream in order to achieve optimum demodulation.

PN code correlation can take twice as long when the demodulator symbol alignment is not synchronized to the transmitted data. This is caused by the fact that if the symbol alignment is off by 50% then every time there is a transition in the data that symbol will accumulate zero energy. However, symbol synchronization cannot typically be accomplished until the PN code has been correlated. It is greatly desired to have a faster method for obtaining PN correlation and symbol synchronization with a spread spectrum signal.

SUMMARY OF THE INVENTION

A method is disclosed for PN correlation and symbol synchronization of a spread spectrum signal at a receiver when a symbol boundary of the spread spectrum signal is not on a PN epoch or is otherwise unknown. The method includes the operation of modulating the spread spectrum signal with a PN code to form a potentially despread signal. The potentially despread signal can be integrated for a plurality of symbol times at a rate of N integrations per symbol time to form N symbol energies per symbol for a plurality of symbols. Each of the N symbol energies can correspond to a different symbol time hypothesis. The N symbol energies from the plurality of symbols can be added respectively to form N summed symbol time hypotheses. The Nth summed symbol time hypothesis having maximum power can be found. The Nth summed symbol time hypothesis can relate to a location of the symbol boundary.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Before a signal carrying information can be transmitted, the information signal is typically converted to a sinusoidal waveform using bandpass modulation. Bandpass modulation can be either digital or analog. For digital modulation, a sinusoid of duration T is referred to as a digital symbol. The sinusoid has three features that can be used to distinguish it from other sinusoids: amplitude, frequency, and phase. Thus, the bandpass modulation can be defined as the process whereby the amplitude, frequency, or phase of a carrier signal (or a combination of them) can be varied in accordance with the information to be transmitted.

For example, phase shift keying (PSK) can be accomplished by varying the phase of the carrier signal according to the equation $$s_i(t) = \sqrt{\frac{2E}{T}} \cos[\omega_o t + \phi_i(t)] \quad \begin{matrix} 0 \le t \le T \\ i = 1, \ldots, M \end{matrix}$$

Where $\omega_o$ is the radian frequency of the carrier, E is the energy in joules of the carrier per T seconds, and the phase term $\phi_i(t)$ has M discrete values, typically given by $$\phi_i(t) = \frac{2\pi i}{M} \quad i = 1, \ldots, M$$

Once the signal has been modulated onto the carrier signal, the modulated carrier signal can then be spread using a PN code. The PN code is comprised of a pseudo random digital signal. The PN code is designed to simulate random noise, but unlike real noise, the PN code repeats after a specified interval, making it a pseudo random signal. The location where the PN code repeats is referred to as the PN Epoch.

Spreading the modulated carrier signal with the PN code can be accomplished using a PSK modulation technique, similar to the technique described above. Rather than modulating the data signal onto the carrier, as above, a PN code signal is modulated onto the modulated carrier signal. The data rate of the PN code signal, commonly referred to as the chip rate, is typically a number of times faster than the symbol rate of the modulated carrier signal. Thus, a plurality of PN chips is modulated onto each symbol in the modulated carrier signal. It is also possible to reverse the steps above, wherein the signal is first spread with a PN code and then the information is modulated onto the spread signal.

At the receiving end of the data link the signal must be either demodulated and despread or despread and demodulated in order to recover the information signal. The spread signal can be despread by modulating the spread signal with the same PN code used to spread it. The PN code at the receiving end must be synchronized with the PN code modulated onto the spread signal. If the PN Epoch occurs at a symbol boundary then the location of the symbol boundary can be determined as soon as the PN code is synchronized. However, if the PN Epoch does not occur on a symbol boundary, then the symbol boundary must also be found in order to maximize the energy received in the signal. What is needed is a quick and efficient method for finding the symbol boundary when the PN Epoch does not occur on the symbol boundary.

Figure 1:
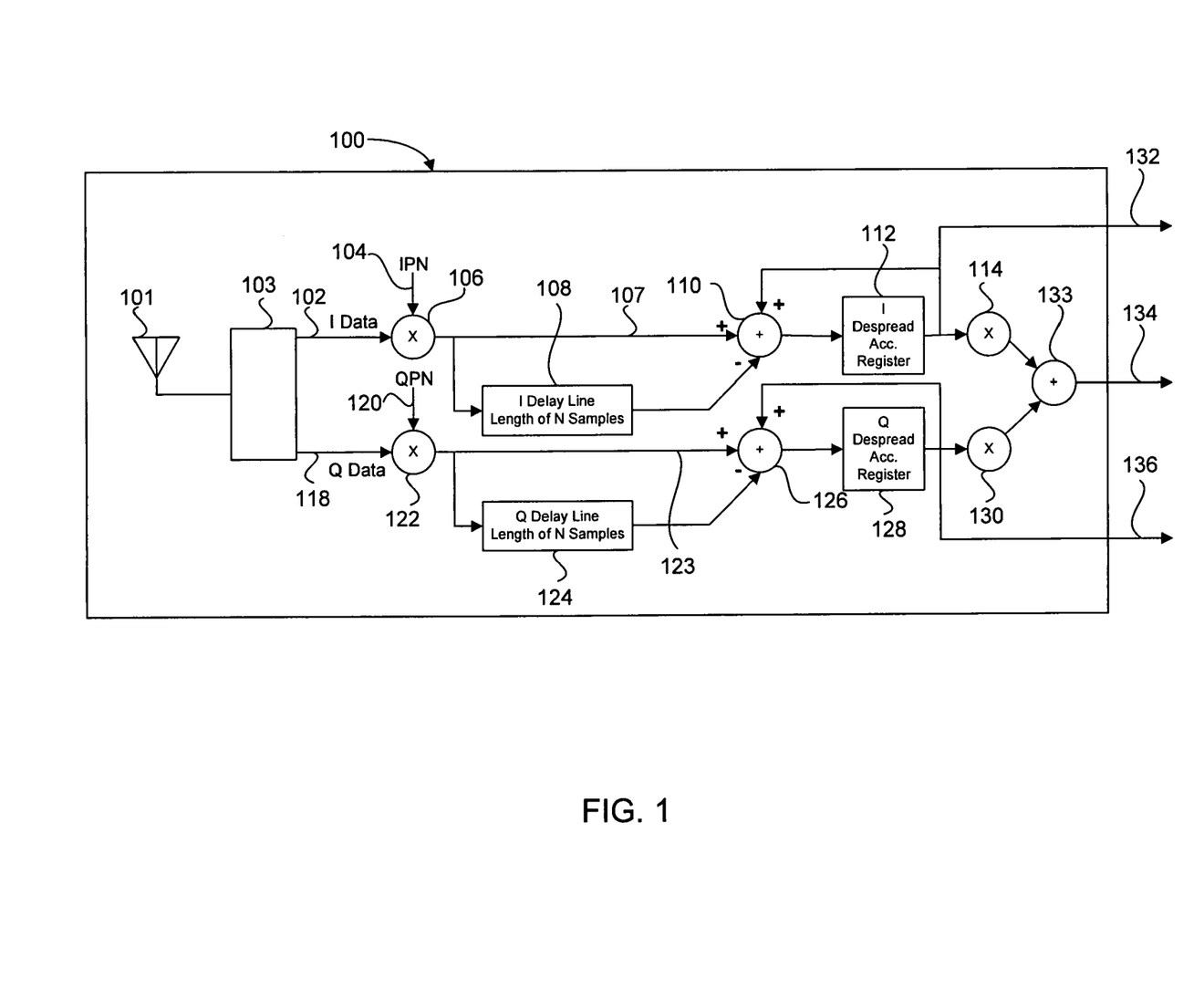
FIG. 1 is a block diagram of a PN correlation and symbol synchronization system in accordance with an example embodiment of the present invention.
Figure 2:
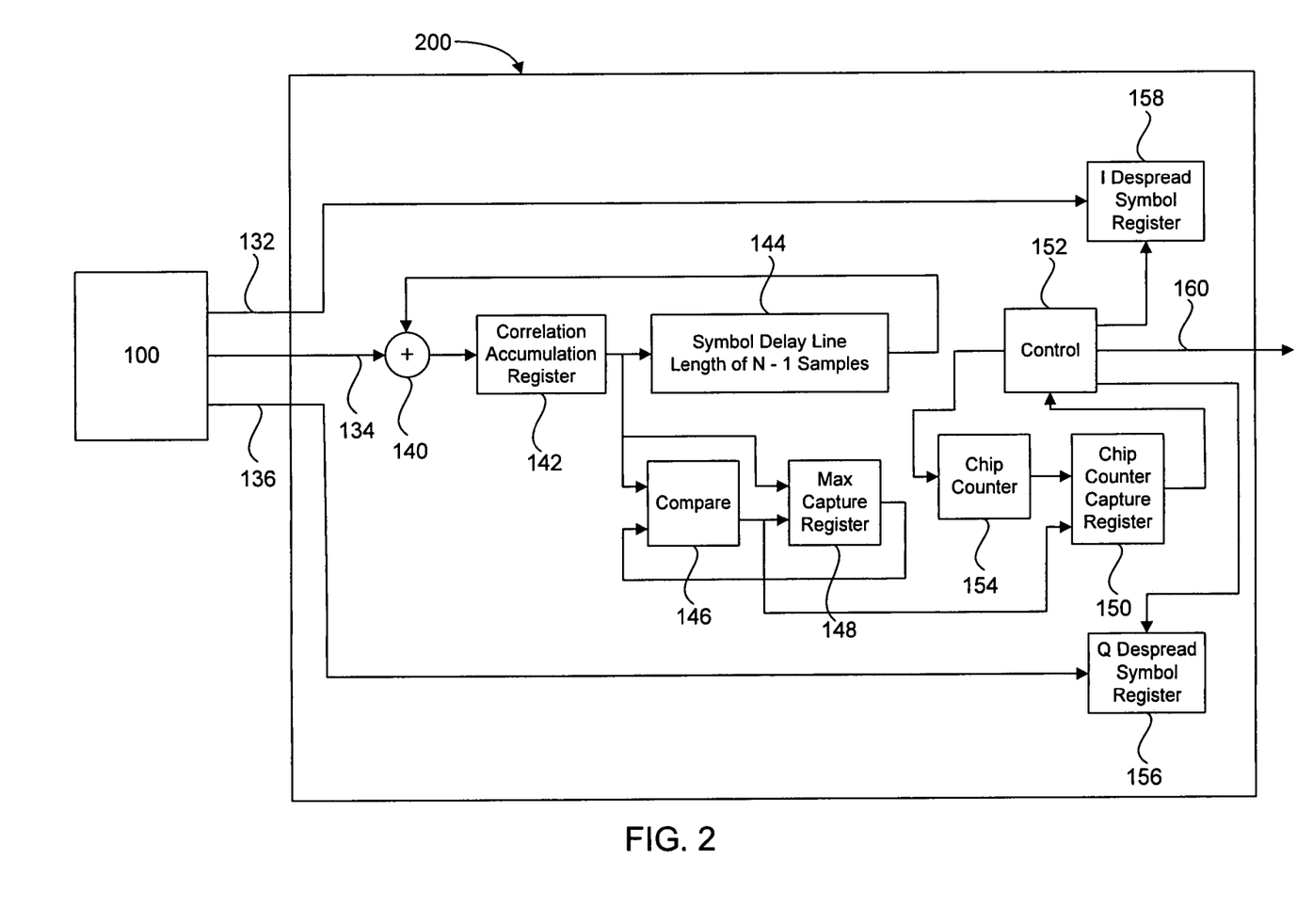
FIG. 2 is a continuation of the block diagram of FIG. 1.

In order to overcome the problems described and to provide an efficient method for symbol synchronization, the present invention provides a system and method for symbol synchronization of a spread spectrum signal at a receiver when a symbol boundary of the signal is unknown and not on a PN epoch. Such a system is illustrated in FIGS. 1 and 2. The illustration is not meant to limit the design of any symbol synchronization circuits, only to show one possible configuration.

In one example embodiment, the spread spectrum signal can be modulated before transmission using a form of PSK modulation, as previously described, with i=1, called binary phase shift keying (BPSK). The system can include a receiver 101 at which the spread spectrum signal can be received and amplified. The phase of the BPSK signal at the receiver is unknown. In order to receive the maximum power from the signal at the receiver, the energy from both the in-phase and quadrature-phase portions of the signal can be used. The BPSK spread spectrum signal can be separated 103 into an in-phase component (I) signal 102 and a quadrature phase component (Q) signal 118.

The spread I signal 102 can then be despread 106 by multiplying the I signal by the I PN code (at the chipping rate) 104 to form a despread I signal 107. The I PN code is the same code that is used to spread the in-phase component before the modulated carrier signal is transmitted. The spread I signal can be exclusive OR'd (XOR) with the I PN code at the chip rate. If the PN Epoch, the position in the PN code where the code repeats, is aligned with each symbol boundary, then the location of the symbol boundary can be determined from the location of the PN Epoch. If the PN Epoch and the symbol timing are not aligned, then the location of each symbol boundary must be determined in order to maximize the energy received from each symbol.

The despread I signal 107 is comprised of a plurality of symbols, each symbol having a symbol time. The number of symbols in the plurality of symbols is determined by the sampling duration of the signal. Sampling the signal over a greater number of symbols can increase the accuracy in determining the symbol boundaries. This will be discussed more fully below.

The energy from each symbol can be found by integrating the signal over each symbol time, effectively summing the power in each symbol. If the integration of the symbol is not aligned with the symbol time, however, then the integration may, in the worst case, sum half of a first symbol with half of a second symbol. In a case where a first symbol is represented by a +1 and the second symbol is represented by a −1, the integration of half of the +1 symbol and half of the −1 symbol is equal to zero. Thus, if the symbol timing is off by half, the overall signal energy received can be minimal. In a random signal there is a transition between +1 and −1 approximately half of the time. Therefore, the overall signal energy of a received signal prior to symbol alignment is about half of the expected power.

In one embodiment, the symbol boundary can be found by employing a sliding integrator to perform N different integrations on the despread I signal 107, wherein each of the N integrations is performed for the length of the symbol time, with each integration offset a predetermined amount of time from the previous integration. In other words, the N integrations can act as a sliding window, enabling a test for the correct symbol boundary to be performed at N different locations for each symbol in the despread signal. The N integrations can represent N different symbol time hypotheses. The symbol time hypothesis with the maximum energy can have the maximum likelihood of defining the symbol boundaries of the despread I signal. Once the symbol boundary is known, the despread I signal can be phase rotated so that all the signal energy is on the I channel, allowing the despread I signal to be recovered.

Referring again to FIG. 1, the sliding integrator can be implemented by coupling an I delay line 108 having a delay length of N samples to the despread I signal 107. The I delay line output can then be subtracted from the despread I signal, with the difference stored in an I despread accumulation register 112. The output of the I despread accumulation register can be looped back and summed with the difference of the despread I signal and the I delay line to create an I sliding integrator loop 110. The result of the I sliding integrator loop is again stored in the I despread accumulation register. Finally, the output of the I despread accumulation register can be squared 114. Alternatively, the absolute value of the I despread accumulation register can also be used.

Similarly, the spread Q signal 118 can be despread 122 by multiplying the spread Q signal by the Q PN code 120. The Q PN code is the same code that is used to spread the quadrature component before the modulated carrier signal is transmitted. The spread Q signal can be XOR'd with the PN code at the chip rate to form a despread Q signal 123. A Q delay line 124 having a delay length of N samples can be coupled to the despread Q signal. The Q delay line output can then be subtracted from the despread Q signal; with the difference stored in a Q despread accumulation register 128. The output of the Q despread accumulation register can then be looped back and summed with the difference of the despread Q signal and the Q delay line to create the Q sliding integrator loop 126. The result of the Q sliding integrator loop is again stored in the Q despread accumulation register. The outputs of the Q despread accumulation register can then be squared 130 or absolute valued. The positive values of the I and Q despread accumulation registers, having been squared or absolute valued, can then be combined 133 together to form N symbol time hypotheses 134 for each symbol.

Alternatively, the spread I signal 102 and spread Q signal 118 can be despread, squared (or absolute valued) and combined prior to the sliding integrator. Combining the I and Q signals prior to the sliding integrator can reduce the amount of hardware (or software) used to form the N symbol time hypotheses 134.

The maximum of the N symbol time hypotheses 134 for any symbol in the plurality of symbols should theoretically lead to determining the correct symbol boundaries, as discussed above. However, in reality, signal noise in the received signal can randomly add and subtract power from the received signal. Thus, the actual symbol boundaries may be masked by noise on the signal. The noise on the symbols can cause certain of the N symbol time hypotheses to have an energy greater or less than what their value should be. The noise in the received signal can be overcome, however, by taking advantage of the randomness of the noise. Truly random noise will be positive as often as it is negative. Thus, by summing or averaging the value of each of the N symbol time hypotheses of a symbol with the N symbol time hypotheses of the remaining plurality of symbols, respectively, the noise on the N symbol time hypotheses for each symbol can be effectively diminished.

Referring to FIG. 2, the N symbol time hypotheses 134 for each of the plurality of symbols can be sent to a correlation accumulator 200. The correlation accumulator can be configured to correlate the N symbol time hypotheses of each symbol and accumulate their respective values. The N symbol time hypotheses can be sent to a correlation accumulation register 142. The output of the correlation accumulation register can be sent to a symbol delay line 144 having a length of N−1 samples. The output of the symbol delay line 144 can be summed 140 with the N symbol time hypotheses 134 to form a feedback loop. The feedback loop enables the correlation accumulation register to contain N summed symbol time hypotheses of the plurality of symbols over which the I and Q despread signals 107 and 123 (FIG. 1) were integrated.

The feedback loop results in each of the N symbol time hypotheses of a symbol being added to the N symbol time hypotheses of a plurality of symbols respectively. For example, a first symbol can have N symbol time hypotheses. The N1 symbol time hypothesis of the first symbol can be added to the N1 symbol time hypotheses of the second, third, and fourth symbols. Similarly, the N2 symbol time hypothesis of the first symbol can be added to the N2 symbol time hypotheses of the second, third and fourth symbols, and so forth. Each of the N symbol time hypotheses can be respectively summed over a plurality of M symbols.

Figure 3:
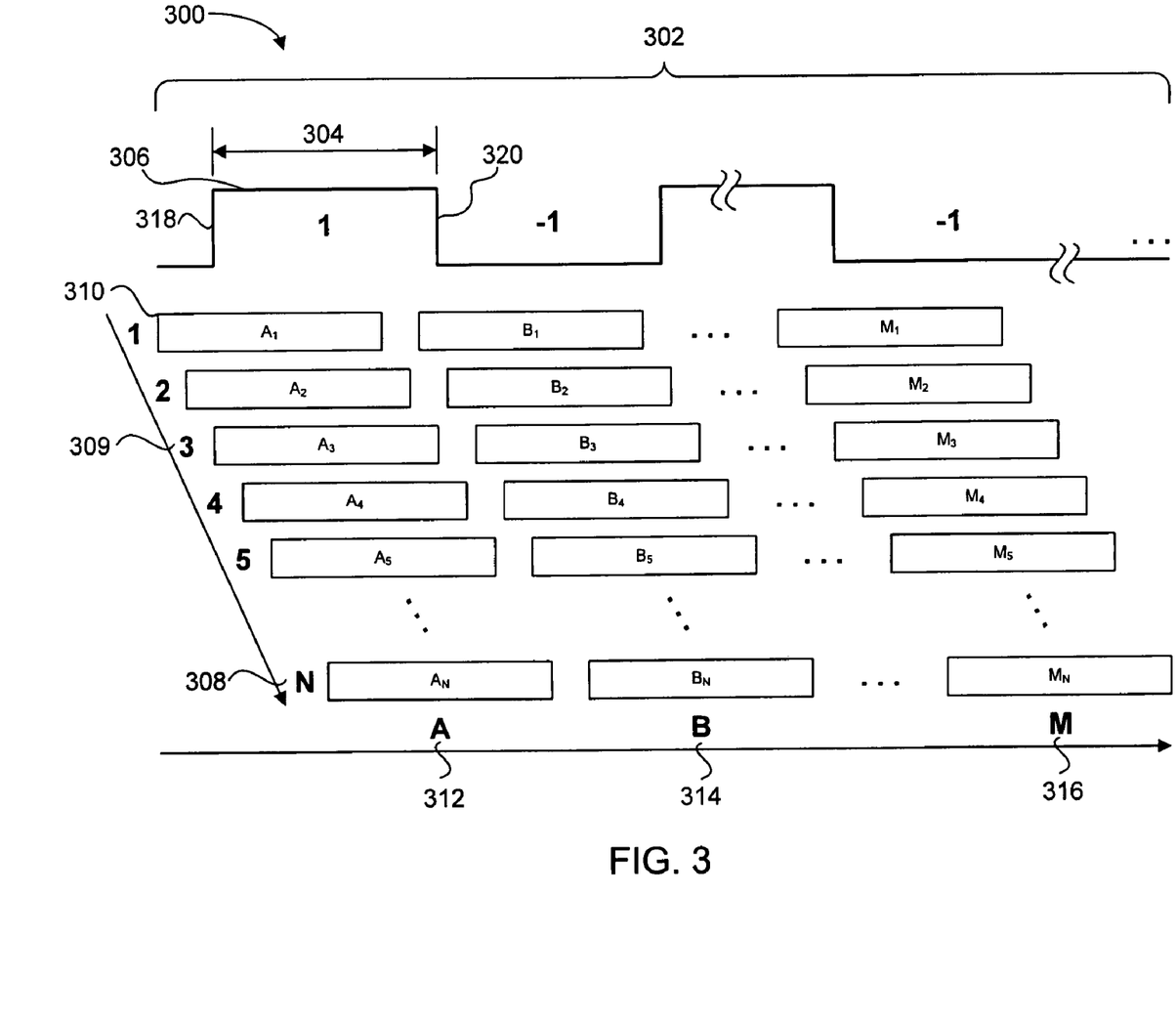
FIG. 3 is a block diagram showing an example timing diagram of N integrations per symbol taken over M symbols in accordance with an embodiment of the present invention.

The description above can be viewed more readily by referring to diagram 300 showing a representation of a plurality of symbols, each being integrated at N different times to find a symbol boundary, as shown in FIG. 3. A despread carrier signal 302 having a symbol time 304 is shown. In the present figure, the data shown is represented as symbols having amplitudes of 1 and −1. When the despread signal 302 is received at the receiver, the symbol boundaries, such as the rising edge 318 and falling edge 320 of symbol 306, are unknown. The sliding integrator 100 (FIG. 1) can produce N symbol time hypotheses 308 for each symbol, with each hypothesis offset a predetermined amount of time from the previous hypothesis. The amount of the offset may be determined by the sampling rate of the despread signal. Each hypothesis can have an integration length substantially similar to the length of the symbol time.

A set of N symbol time hypotheses 312 can be generated, with each symbol time hypothesis representing an integration of the despread signal 302 over a period substantially equal to a symbol time. To average any noise in the despread signal, N symbol time hypotheses can be generated for a plurality of M symbols. The respective symbol time hypotheses can then be summed together. For example, $A_1$, $B_1$ . . . and $M_1$ can be added together, $A_2$, $B_2$ . . . and $M_2$ can be added, and so forth until $A_N$, $B_N$, and $M_N$ are added to form N summed symbol time hypotheses. By adding the N respective symbol time hypotheses, a substantial amount of any noise present on the despread signal can be averaged out.

The maximum value of the N summed symbol time hypotheses can then be found to establish which of the N summed symbol time hypotheses has the maximum likelihood of having the correct symbol boundary. In the present example, shown in FIG. 3, integrating and summing each of the plurality of M symbols for N different times will show that the $3^{rd}$ symbol time hypothesis 309, for the symbols A through M, best represents the actual symbol timing. Integrating the despread signal 302 over the time period represented after the summation of $A_3$ through $M_3$ will result in the greatest power. Thus, the rising and falling edge of $A_3$ through $M_3$ best represent the actual symbol timing in the despread signal in this example.

Returning to FIG. 2, the output of the correlation accumulation register 142, which contains the N summed symbol time hypotheses, can be sent to a comparator 146 and a Max Capture Register 148. Each time one of the N summed symbol time hypotheses enters the comparator the new summed symbol time hypothesis power can be compared with the power of the previous summed symbol time hypothesis. If the comparator indicates that the power of the new summed symbol time hypothesis is larger than the power of the previous summed symbol time hypothesis, then the Max Capture Register can be updated with the new maximum value. The Chip Counter 154 can be updated as each of the N summed symbol time hypotheses enter the comparator. When a new maximum value is sent to the Max Capture Register, the Chip Counter Capture Register 150 can be updated with the location of the hypothesis in the N summed symbol time hypotheses. Thus, after the N summed symbol time hypotheses have been compared, the Max Capture Register can contain the maximum power of the N summed symbol time hypotheses and the Chip Counter Capture Register can identify which of the N summed symbol time hypotheses contains the maximum power. The location can then be sent from the Chip Counter Capture Register to a Control 152.

The I Despread Accumulation Register output 132 can be sent to an I Despread Symbol Register 158. Similarly, the Q Despread Accumulation Register output 136 can be sent to a Q Despread Symbol Register 156. The I and Q despread accumulation registers can hold an I symbol and Q symbol sent from the respective accumulate registers. The Control 152, using the output of the Chip Counter Capture Register, can enable the symbols in the I and Q despread accumulation registers to be transmitted according to their symbol timing. The Control 152 can then be used to output a symbol clock which is substantially synchronized to the symbol timing on the I and Q despread signals for downstream clocking in a receiver.

It should be apparent to one of skill in the art that the present invention can be used for symbol synchronization for a variety of different types of signals. The previous example of synchronizing a BPSK signal containing I and Q data is only one illustration. For example, the example setup shown in FIGS. 1 and 2 can also be used to determine symbol synchronization in a QPSK signal.

A simpler configuration can be created for an FSK or AM signal, wherein the I and Q data paths can be merged into a single data path comprising a despreader 106, a delay line 108, a summer to create a sliding integrator loop 110, a despread accumulation register 112, and a method for obtaining the magnitude of the output of the accumulate register, such as the multiplier 114. This output of the multiplier 114 can comprise N symbol time hypotheses for each symbol in the signal. The N symbol time hypotheses of one symbol can then be summed together with the N symbol time hypotheses of other symbols in a plurality of symbols using a summer 140, a correlation accumulation register 142, and a symbol delay line having a length of N−1 samples to create N summed symbol time hypotheses, as has previously been discussed. The Nth summed symbol time hypothesis having maximum power can then be determined using a comparator and chip counters. The location of the Nth summed symbol time hypothesis having maximum power can be used to substantially determine the correct symbol timing in the received signal.

A physical embodiment of the system described in FIG. 1 and FIG. 2 can be constructed in a variety of ways, as should be apparent to one skilled in the art. For example, the example system can be fabricated using solid state memory and a processor. The processor can be a digital signal processor, a central processing unit such as an Intel X86 chip or an IBM PowerPC chip, or an equivalent processor. Alternatively, the system can be realized using a microcontroller or a reconfigurable Field Programmable Gate Array (FPGA) computer chip such as a Xilinx programmable logic device.

Figure 4:
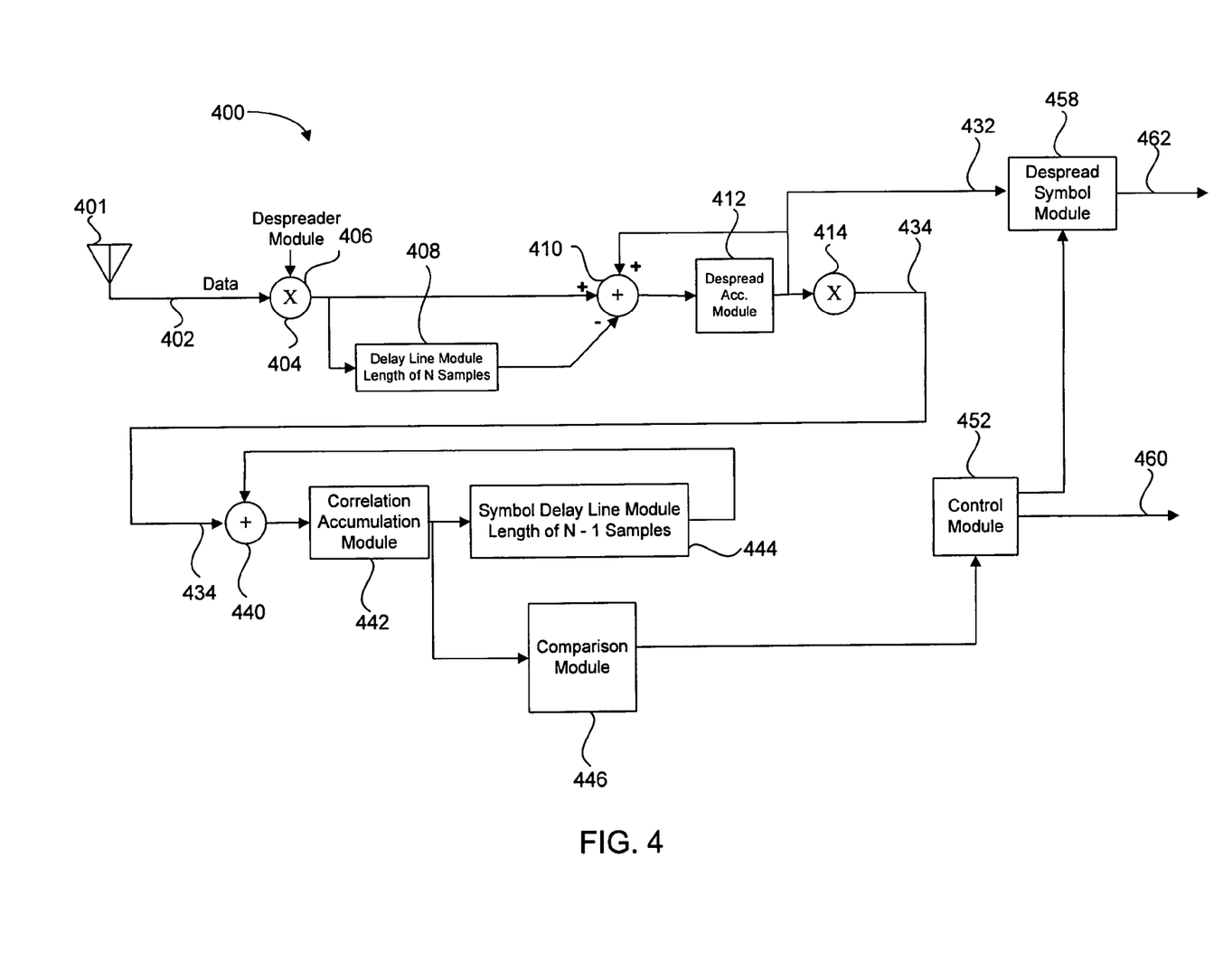
FIG. 4 is an additional embodiment of the PN correlation and symbol synchronization system in accordance with an example embodiment of the present invention.

In one example embodiment, a PN correlation and symbol synchronization system 400 can comprise a receiver 401 to receive the spread spectrum signal, as shown in FIG. 4. A despreader module 404 can be connected to the receiver and configured to despread the spread spectrum signal 402. Methods for despreading are well known to those skilled in the art. The output of the despreader module can be sent to a summing module 410 and a delay line module 408. The delay line module can have a delay length of N samples and can be constructed from N shift registers. Alternatively, the delay line module can be accomplished using solid state memory such as random access memory (RAM), magnetic RAM, Flash RAM, or a combination of these devices. The output of the delay line can be sent to the summing module.

The output of the summing module 410 can be sent to a despread accumulation module 412 that is configured to accumulate the despread signal output from the summing module. The despread accumulation module can be constructed using solid state memory similar to the delay line module 408. The output of the despread accumulation module can be sent to the summing module. The summing module can then sum the output of the despread accumulation module and the despreader module 404 and subtract the output of the delay line module to form a sliding integrator loop. The output of the summing module can again be sent to the despread accumulation module. The output of the despread accumulation module can comprise N symbol time hypotheses for each of the plurality of symbols.

The output of the despread accumulation module 412 can be sent to a magnitude module 414. The magnitude module can be used to find the magnitude of the output by determining the square of the amplitude of the signal or the absolute value of the signal. The output 434 of the magnitude module can then be sent to a second summing module 440. The output of the second summing module 440 can be sent to a correlation accumulation module 442. The correlation accumulation module can be formed of solid state memory similar to the delay line module 408. The output of the correlation accumulation module can be sent to a symbol delay line module 444.

The symbol delay line module can provide a delay of N−1 samples. The symbol delay line module can be formed of N−1 shift registers. Alternatively, it could be formed using solid state memory similar to the delay line module. The output of the symbol delay line can be sent back to the second summing module 440 to form a summing loop configured to add each of the N symbol time hypotheses to the respective symbol time hypotheses of the plurality of symbols. The output of the correlation accumulation module can comprise N summed symbol time hypotheses.

The output of the correlation accumulation module 442 can be sent to a comparison module 446. The comparison module can be configured to compare the N summed symbol time hypotheses and find the summed symbol time hypothesis having maximum power. The comparison module can also be configured to determine the location of the summed symbol time hypothesis in the series of N summed symbol time hypotheses. The location can be used to substantially determine the location of the rising and falling edge of the symbols in the despread signal to accurately determine the symbol timing. The comparison module can be realized using individual components such as comparators, counters, and memory. Alternatively, a microprocessor and memory can be used to implement the comparison module's functions.

The comparison module 446 can output the substantially correct symbol timing to a control module 452. The control module can be used to control a despread symbol module 458. The despread symbol module can receive the despread signal from the despread accumulation register 412. The control module can then be used to transmit the despread symbol module output 462 according to the substantially correct symbol timing obtained from the control module 452. A control module output 460 can also be used for downstream clocking in the receiver.

In another embodiment, the previously described PN correlation and symbol synchronization system can be applied to a spread spectrum signal that may not have been properly despread. As previously discussed, a spread spectrum signal can be despread by remodulating the received spread spectrum signal with a synchronized replica of the PN code with which it was modulated.

Figure 5A:
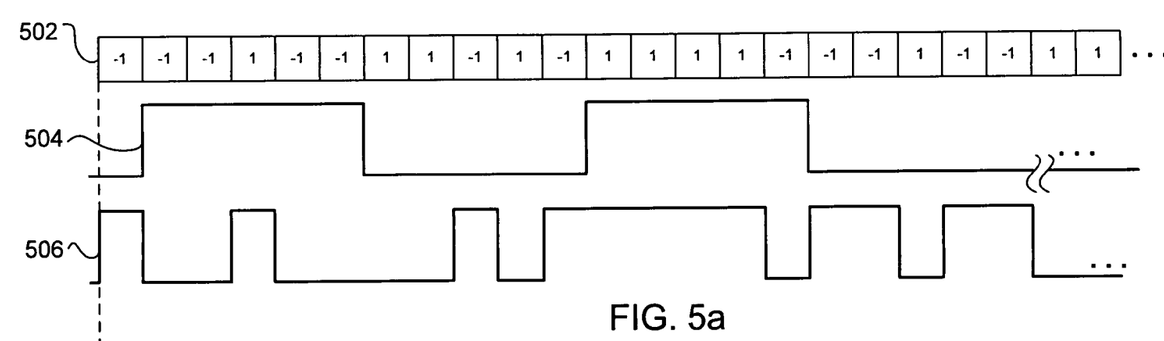
FIGS. 5a-c are a timing diagram showing a simple example of PN code spreading and de-spreading a modulated signal in accordance with an example embodiment of the present invention.
Figure 5B:
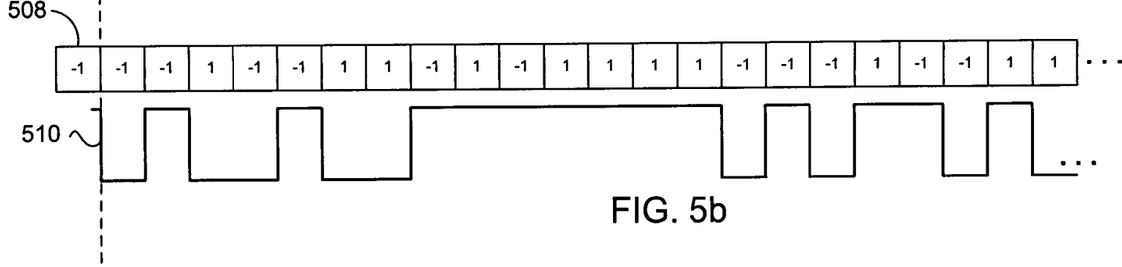
Figure 5C:
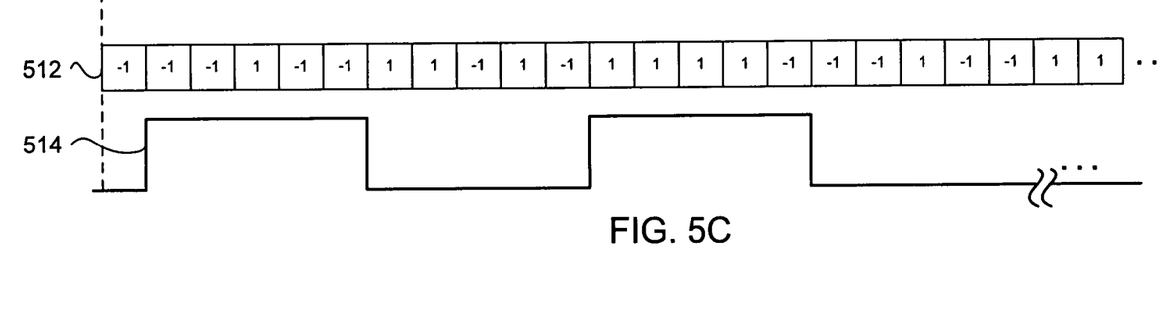

A simple example of spreading and despreading a signal is shown in FIGS. 5a-5c. As shown in FIG. 5a, the modulated carrier signal 504 can be spread before being transmitted by modulating the carrier signal with a PN code 502 resulting in a spread spectrum signal 506. The PN code in the figure is represented by +1 and −1 chips. Each +1 chip will leave the signal unchanged. Each −1 chip will alter the state of the signal. The PN code at the receiver must be synchronized, or aligned, with the PN code that was modulated onto the carrier signal when it was transmitted. If the PN code at the receiver is unaligned 508 from the PN code modulated onto the spread spectrum signal by just a single chip, as shown in FIG. 5b, then the PN modulation will result in a scrambled signal 510 having many of the characteristics of random noise. Once the PN code at the receiver is substantially aligned 512 with the PN code modulated onto the carrier signal, re-modulating the spread spectrum signal with the substantially aligned PN code will result in obtaining the original modulated carrier signal 514, as shown in FIG. 5c.

Previously, the PN code alignment and symbol synchronization have been accomplished in two steps. First, the spread spectrum signal is re-modulated with the PN code to form a potentially despread signal. The power in the potentially despread signal can then be accumulated over a plurality of symbol times for twice as long as would be needed for correlation if symbol alignment were known. This can be necessary because, as previously discussed, if the symbol alignment is off by 50%, then every time there is a transition in the data that symbol would accumulate to zero energy. Over time, assuming a substantially random PN code that transitions between states approximately half of the time overall, a signal having symbol alignment that is off by 50% can average essentially half power at the receiver.

After the spread spectrum signal has been re-modulated by the PN code to form the potentially despread signal, power can be accumulated for a plurality of symbol times. The power can be accumulated for twice as long as would be needed if symbol alignment were known. The accumulated power can then be compared with a predetermined threshold. If the accumulated power of the potentially despread signal exceeds a predetermined threshold, it can be assumed that PN code alignment has been achieved. If the accumulated power is less than the predetermined threshold, the PN code at the receiver can be shifted by a half chip, re-modulated with the spread spectrum signal, and power can again be accumulated for a plurality of symbol times. This can be repeated until the power accumulated is greater than the predetermined threshold. When the accumulated power is greater than the predetermined threshold then PN code alignment can be assumed and the signal can be presumed to be despread. Previously, the despread signal would then have to be synchronized with a signal at the receiver. Synchronizing the despread signal with a signal at the receiver can take as long as obtaining PN code alignment.

Using the present invention, however, symbol synchronization and PN code alignment can be performed simultaneously, even when the PN epoch does not occur at the symbol boundary. The spread spectrum signal can be re-modulated with the PN code to form a potentially despread signal. The potentially despread signal can be sent to the sliding integrator 100 (FIG. 1), which can produce N symbol time hypotheses for each symbol. The N symbol time hypotheses for a plurality of symbols of the potentially despread signal can then be added together to form N summed symbol time hypotheses, as previously shown. The maximum power of the N summed symbol time hypotheses can then be found. Each of the N summed symbol time hypotheses can have a width substantially similar to each symbol in the potentially despread signal, with each of the N summed symbol time hypotheses being temporally offset from the previous summed symbol time hypothesis, as shown in FIG. 3. By knowing the location of the Nth summed symbol time hypothesis having maximum power, the symbol boundaries in the potentially despread signal can be determined.

When the power of the Nth summed symbol time hypothesis having maximum power is greater than a predetermined threshold, it can be assumed that PN code alignment has been achieved and that the potentially despread signal has, in fact, been despread. The summed symbol time hypothesis having the most power can be used to simultaneously determine the symbol timing, and the despread signal can be synchronized with a signal at the receiver and demodulated. Thus, when the PN code is aligned, the symbol boundaries can be known, enabling PN code alignment and symbol synchronization to be performed in as little as half the time previously required.

Once the symbol synchronization has been substantially determined, the sliding integrator 100 and correlation accumulator 200 can be used to refine the symbol boundary by looking over a longer PN correlation accumulation time to see if the timing of the Nth summed symbol time hypotheses having maximum power was slightly wrong and needs to be corrected. This can be accomplished by operating the sliding integrator and correlation accumulator 200 for a longer time over a greater number of symbols. The PN correlation accumulator 200 can also be enabled to detect when the values in one or both of the despread accumulation registers 112 and 128 (FIG. 1) are negative for an entire symbol time. When this occurs, the correlation can be dismissed early. The PN code at the receiver can then be shifted a half chip relative to the spread spectrum signal. Early dismissal can enable faster correlation between the PN code at the receiver and the PN code on the spread spectrum signal.

Figure 6:
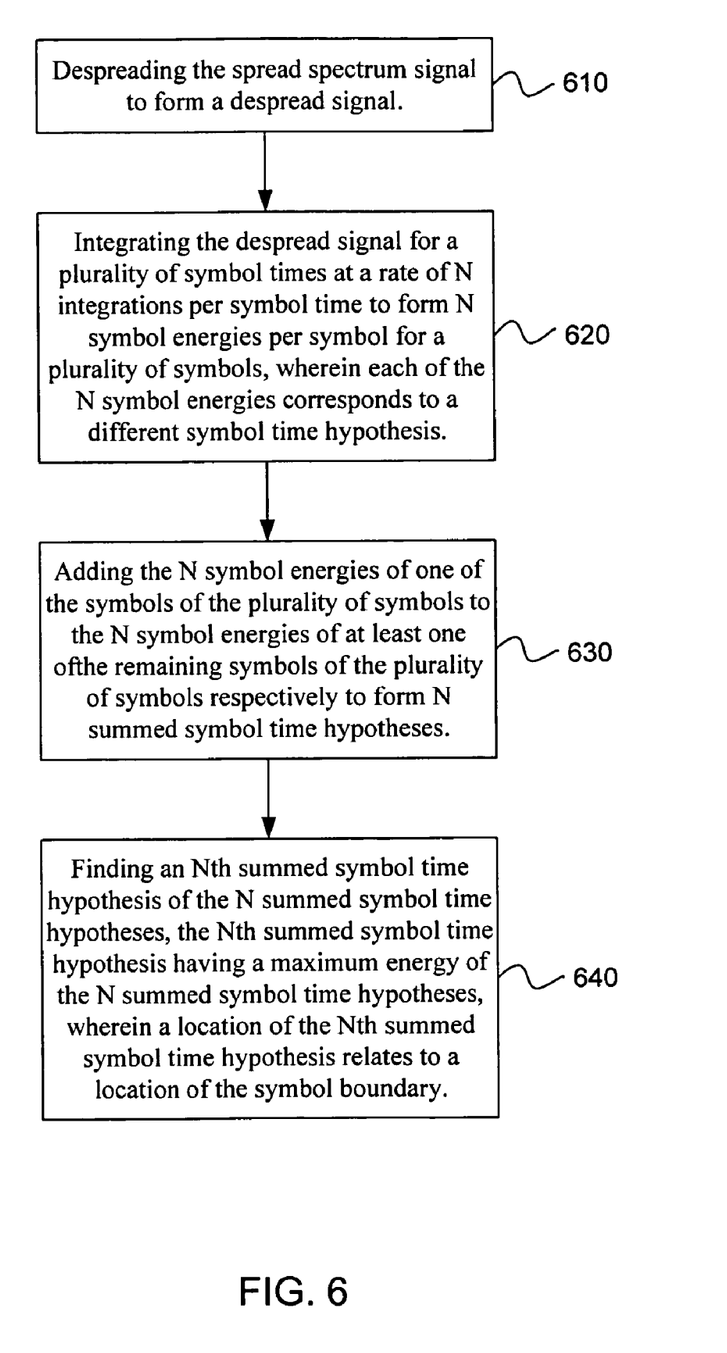
FIG. 6 is a flow chart depicting a method for symbol synchronization of a spread spectrum signal at a receiver when a symbol boundary of the signal is unknown in accordance with an example embodiment of the present invention.

Another aspect of the invention provides a method for symbol synchronization of a spread spectrum signal at a receiver when a symbol boundary of the signal is not on a PN epoch or is otherwise unknown, as depicted in the flow chart of FIG. 6. The method includes the operation of despreading the spread spectrum signal to form a despread signal, as shown in block 610. Before transmitting, the signal may have an information signal modulated onto a carrier signal by varying the amplitude, frequency, or phase of the radio frequency (RF) carrier. The information signal may also be modulated onto the carrier signal by varying a combination of the amplitude, frequency, and/or phase. The modulated carrier signal may then be spread by modulating the carrier signal with a PN code, wherein the PN code has a data rate, or chip rate, a plurality of times faster than the data rate of the modulated carrier.

The spread spectrum signal can be received by an antenna. The spread spectrum signal may be split into different components depending on the format with which the information signal was modulated onto the carrier signal. For example, if the information signal was modulated onto the carrier signal using a QPSK modulation format, the spread spectrum signal can be divided into its in-phase (I) signal and quadrature (Q) signal components. The carrier signal can then be despread by modulating the spread spectrum signal with the same PN code that is used to spread the signal before it is transmitted.

A further operation involves integrating the despread signal for a plurality of symbol times at a rate of N integrations per symbol time to form N symbol energies per symbol for a plurality of symbols, wherein each of the N symbol energies corresponds to a different symbol time hypothesis, as shown in block 620. Each of the symbol time hypotheses can be offset in time from the previous symbol time hypothesis. Each of the N integrations can have a length substantially similar to the length of the symbol time. Since it is unknown at this point how each of the symbol time hypotheses are aligned with their symbol, the first of the N symbol time hypotheses may start and stop at any point with relation to the symbol.

For example, FIG. 3 shows a diagram of a despread carrier signal 302 having a symbol time 304. The integrations forming the N symbol time hypotheses can be started at any time with respect to the modulated carrier signal. The first symbol shown 306 in the modulated carrier signal can have N integrations to form N symbol energies that represent N different symbol time hypotheses 312. The first of the N symbol time hypotheses may occur at any point along the despread carrier signal 302. In one embodiment, the N symbol time hypotheses for each of the plurality of symbols can be spaced over a time that is over 100% of the symbol time. This can ensure that at least one of the N symbol time hypotheses will closely match up with the symbol timing. Each of the N symbol time hypotheses can have a width substantially equal to the width, on average, of each symbol in the despread signal.

Returning to the method of FIG. 6, a further operation can be adding the N symbol energies of one of the symbols of the plurality of symbols to the N symbol energies of at least one of the remaining symbols of the plurality of symbols respectively to form N summed symbol time hypotheses, as shown in block 630. As previously discussed, the N symbol energies of each symbol integrated can be summed together respectively with the N symbol energies of the remaining symbols in order to average out noise present on the received signal. Summing the N symbol energies of the multiple symbols respectively results in N summed symbol time hypotheses, wherein the N summed symbol time hypotheses can have an averaged amount of noise in each of the hypotheses. The probability of error caused by noise on the signal can be reduced by summing a plurality of symbols.

A further operation involves finding an Nth summed symbol time hypothesis of the N summed symbol time hypotheses, the Nth summed symbol time hypothesis having a maximum energy of the N summed symbol time hypotheses, wherein a location of the Nth summed symbol time hypothesis relates to a location of the symbol boundary, as shown in block 640. The Nth summed symbol time hypothesis having the maximum power can be assumed to have the maximum likelihood of being aligned with the correct symbol timing of the symbols in the modulated carrier signal.

The Nth summed symbol can be found using a comparison module. The comparison module can be configured to compare the N summed symbol time hypotheses and find the Nth summed symbol time hypothesis having maximum power. The comparison module can also be configured to determine the location of the Nth summed symbol time hypothesis having maximum power in the series of N summed symbol time hypotheses. The location can be used to substantially determine the location of the rising and falling edge of the symbols in the modulated carrier signal to accurately determine the symbol timing.

Thus, by knowing the rise time and fall time of the Nth summed symbol time hypothesis having the maximum power, the rise and fall times of the symbols in the modulated carrier signal can be presumed, and the modulated carrier signal can be synchronized with a signal in the receiver. Synchronizing the signals can allow the maximum power from the modulated carrier signal to be received, which can decrease the bit error rate, allowing the signal to be more accurately demodulated.

Figure 7:
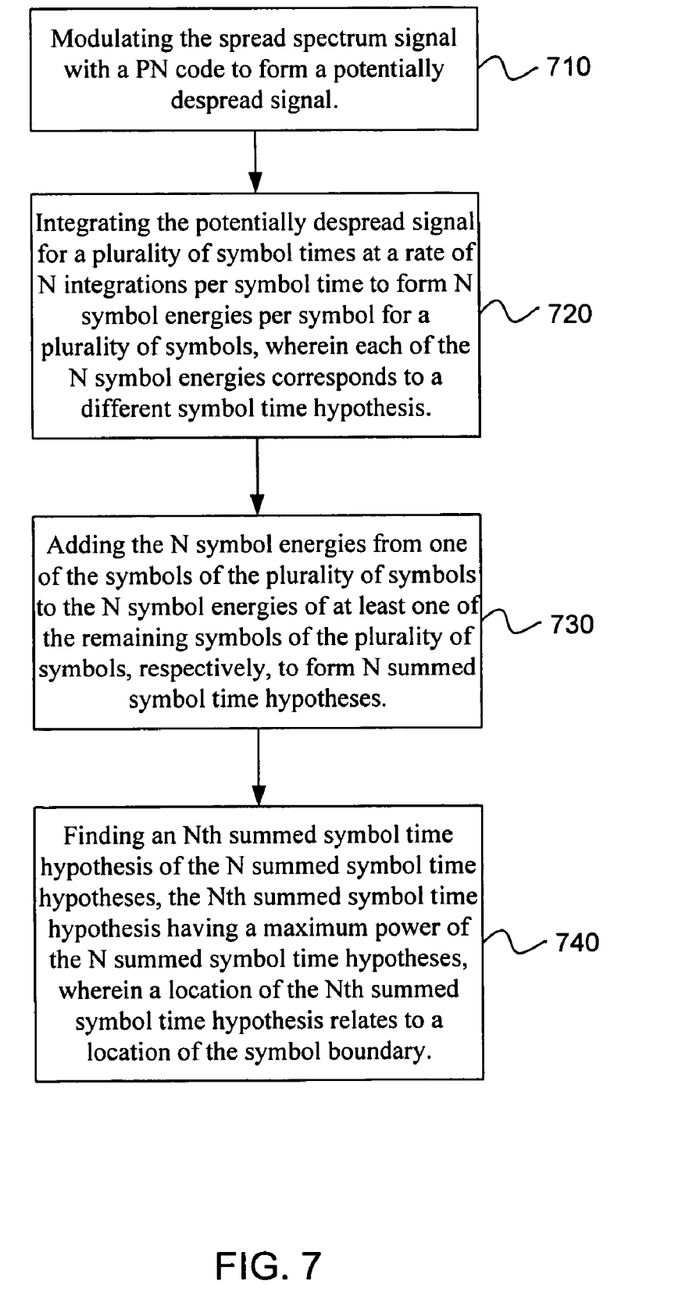
FIG. 7 is a flow chart depicting a method for PN correlation and symbol synchronization of a spread spectrum signal at a receiver when a symbol boundary of the spread spectrum signal is unknown in accordance with an example embodiment of the present invention.

Another aspect of the invention provides a method for PN correlation and symbol synchronization of a spread spectrum signal at a receiver when a symbol boundary of the spread spectrum signal is not on a PN epoch or is otherwise unknown, as illustrated in the flow chart of FIG. 7. The method includes the operation of modulating the spread spectrum signal with a PN code to form a potentially despread signal, as shown in block 710. As previously discussed, a spread spectrum signal can be despread by remodulating the received spread spectrum signal with a synchronized replica of the PN code with which it was modulated. The PN code at the receiver must be synchronized, or aligned, with the PN code that was modulated onto the carrier signal when it was transmitted. When the spread spectrum signal is received at the receiver, there is no way of knowing in advance whether the PN code at the receiver is aligned with the PN code modulated on the spread spectrum signal. Thus, the remodulated spread spectrum signal at the receiver can become a potentially despread signal. It cannot be known without further testing whether the PN code at the receiver is aligned with the PN code modulated on the spread spectrum signal.

A further operation involves integrating the potentially despread signal for a plurality of symbol times at a rate of N integrations per symbol time to form N symbol energies per symbol for a plurality of symbols, wherein each of the N symbol energies corresponds to a different symbol time hypothesis, as shown in block 720. The potentially despread signal can be sent through the sliding integrator 100, shown in FIG. 1, to form N symbol time hypotheses for each symbol in the potentially despread signal.

Another operation includes adding the N symbol energies from one of the symbols of the plurality of symbols to the N symbol energies of at least one of the remaining symbols of the plurality of symbols, respectively, to form N summed symbol time hypotheses, as shown in block 730. By summing the N symbol time hypotheses for a plurality of symbols, any possible noise present in the potentially despread signal can be averaged over the plurality of symbols. Averaging over a plurality of symbols can create a greater likelihood of determining the correct boundaries for each symbol, which can be used to find the correct symbol spacing in the potentially despread signal.

A further operation includes finding an Nth summed symbol time hypothesis of the N summed symbol time hypotheses, the Nth summed symbol time hypothesis having a maximum power of the N summed symbol time hypotheses, wherein a location of the Nth summed symbol time hypothesis relates to a location of the symbol boundary, as shown in block 740. The Nth summed symbol time hypothesis having a maximum power can then be compared with a predetermined threshold. If the Nth summed symbol time hypothesis' power is determined to be greater than the predetermined threshold then it can be assumed that the potentially despread signal has been correctly despread. The location of the symbol boundary can be determined from the location of the Nth summed symbol time hypothesis having a maximum power. Understanding the location of the symbol boundary can be used to synchronize the despread signal with a reference signal at the receiver and the despread signal can be demodulated, thus enabling recovery of the data on the data signal at the receiver.

Spread spectrum signals are widely used in communications, from complex military communications systems to inexpensive systems used in wireless phones and data communications. In order to obtain information from a transmitted spread spectrum signal a PN code at the receiver must be correlated with the PN code modulated onto the spread spectrum signal to form a despread signal. Symbol synchronization, involving finding the correct symbol timing in the despread signal is then determined to receive the signal at maximum power. The present invention can be used to determine PN correlation and symbol synchronization at essentially the same time. In communication systems, where timing is often measured in nanoseconds, the amount of time saved by synchronously determining PN correlation and symbol synchronization can be substantial.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for symbol synchronization of a spread spectrum signal at a receiver when a symbol boundary of the signal is not on a pseudo-random noise ("PN") epoch or is otherwise unknown, comprising the steps of:

despreading the spread spectrum signal in a receiver to form a despread signal;

integrating the despread signal in the receiver for a plurality of symbol times at a rate of N integrations per symbol time to form N symbol energies per symbol for a plurality of symbols, wherein each of the N symbol energies corresponds to a different symbol time hypothesis;

adding in the receiver the N symbol energies of one of the symbols of the plurality of symbols to the N symbol energies of at least one of the remaining symbols of the plurality of symbols respectively to form N summed symbol time hypotheses; and finding in the receiver an Nth summed symbol time hypothesis of the N summed symbol time hypotheses, the Nth summed symbol time hypothesis having a maximum energy of the N summed symbol time hypotheses, wherein a location of the Nth summed symbol time hypothesis relates to a location of the symbol boundary.

2. A method as in claim 1, wherein the step of integrating the despread signal further comprises the step of accumulating a symbol energy for each symbol time hypothesis.

3. A method as in claim 1, further comprising the step of integrating the despread signal at the rate of N integrations per symbol time to form N symbol energies per symbol, wherein each of the N integrations has a length substantially similar to the symbol time.

4. A method as in claim 1, further comprising the step of offsetting each of the N symbol time hypotheses from a previous symbol time hypothesis by a predetermined amount of time.

5. A method as in claim 4, wherein the step of offsetting each of the N symbol time hypotheses further comprises the step of offsetting the N symbol time hypotheses such that the hypotheses are temporally spaced over a substantially complete symbol time of the spread spectrum signal.

6. A method as in claim 4, wherein the step of offsetting each of the N symbol time hypotheses further comprises the step of offsetting the N symbol time hypotheses such that the hypotheses are temporally spaced over a period greater than a symbol time of the spread spectrum signal.

7. A method as in claim 2, wherein the step of accumulating the symbol energy for each symbol time further comprises the step of accumulating the symbol energy for each symbol time by squaring the N symbol energies to form N positive symbol energies.

8. A method as in claim 2, wherein the step of accumulating the energy for each symbol time further comprises the step of accumulating the symbol energy for each symbol time by determining an absolute value of the N symbol energies to form N positive symbol energies.

9. A method as in claim 1, wherein the step of integrating the despread signal further comprises the steps of:

integrating an I despread signal for a plurality of symbol times at the rate of N integrations per symbol time to form N symbol energies per symbol, wherein each symbol energy corresponds to a different symbol time hypothesis; and integrating a Q despread signal for a plurality of symbol times at the rate of N integrations per symbol time to form N symbol energies per symbol, wherein each symbol energy corresponds to a different symbol time hypothesis.

10. A method as in claim 9, further comprising the step of summing the N symbol energies from the I despread signal with the N symbol energies from the Q despread signal respectively.

11. A method as in claim 1, wherein the location of the Nth summed symbol time hypothesis is used to determine a substantially correct symbol timing for the despread signal.

12. A method as in claim 11, further comprising the step of using the substantially correct symbol timing for downstream clocking in the receiver.

13. A method as in claim 1, wherein the step of finding an Nth summed symbol time hypothesis of the N summed symbol time hypotheses further comprises the step of comparing each summed symbol time hypothesis power with the previous summed symbol time hypothesis power and storing the summed symbol time hypothesis having greater power.

14. A method as in claim 1, wherein the symbol boundary is not on a PN epoch.

15. A method as in claim 1, wherein each different symbol time hypothesis corresponds to a common PN timing hypothesis.

16. A method for pseudo-random noise ("PN") correlation and symbol synchronization of a spread spectrum signal at a receiver when a symbol boundary of the spread spectrum signal is not on a PN epoch or is otherwise unknown, comprising the steps of:

modulating the spread spectrum signal with a PN code to form a potentially despread signal;

integrating the potentially despread signal for a plurality of symbol times at a rate of N integrations per symbol time to form N symbol energies per symbol for a plurality of symbols, wherein each of the N symbol energies corresponds to a different symbol time hypothesis;

adding in the receiver the N symbol energies from one of the symbols of the plurality of symbols to the N symbol energies of at least one of the remaining symbols of the plurality of symbols, respectively, to form N summed symbol time hypotheses; and finding in the receiver an Nth summed symbol time hypothesis of the N summed symbol time hypotheses, the Nth summed symbol time hypothesis having a maximum power of the N summed symbol time hypotheses, wherein a location of the Nth summed symbol time hypothesis relates to a location of the symbol boundary.

17. A method as in claim 16, further comprising the step of determining whether a summed symbol time hypothesis having a maximum power has a power greater than a predetermined threshold.

18. A method as in claim 17, further comprising the step of shifting the PN code relative to the spread spectrum signal by a set amount and re-determining a new Nth summed symbol time hypothesis having the maximum power if the summed symbol time hypothesis having maximum power is less than the predetermined threshold.

19. A method as in claim 16, wherein the symbol boundary is not on a PN epoch.

20. A method as in claim 16, wherein each different symbol time hypothesis corresponds to a common PN timing hypothesis.

21. A system for substantially synchronous pseudo-random noise ("PN") correlation and symbol synchronization of a received spread spectrum signal comprising a plurality of symbols, comprising:

a modulator configured to modulate the received spread spectrum signal with a PN code to form a potentially despread signal;

a sliding integrator configured to perform N integrations per symbol for the plurality of symbols to form N symbol energies per symbol for the plurality of symbols, wherein each of the N symbol energies corresponds to a different symbol time hypothesis;

a correlation accumulator configured to add the N symbol energies from one of the symbols of the plurality of symbols to the N symbol energies of at least one of the remaining symbols of the plurality of symbols, respectively, to form N summed symbol time hypotheses;

a comparison module configured to find an Nth summed symbol time hypothesis of the N summed symbol time hypotheses, the Nth summed symbol time hypothesis having a maximum power of the N summed symbol time hypotheses, wherein a location of the Nth summed symbol time hypothesis relates to a location of a symbol boundary.

22. A system as in claim 21, wherein the comparison module is further configured to determine whether the power of the Nth summed symbol time hypothesis having the maximum power is greater than a predetermined threshold.

23. A system as in claim 22, wherein the PN code is shifted with respect to the spread spectrum signal and a new Nth summed symbol time hypothesis having the maximum power is determined if the Nth summed symbol time hypothesis having the maximum power is less than the predetermined threshold.

24. A system as in claim 21, wherein the sliding integrator comprises a despreader module, a delay line module, a first summing module, and a despread accumulation module.

25. A system as in claim 24, wherein the despreader module is the modulator configured to modulate the PN code with the received spread spectrum signal to form the potentially despread signal.

26. A system as in claim 24, wherein the delay line module is configured to delay an output of the despreader module by N samples.

27. A system as in claim 26, wherein N is substantially equal to a number of chips of the PN code in each symbol.

28. A system as in claim 24, wherein the first summing module comprises an add/subtract device configured to add an output of the despreader module and an output of the despread accumulation module and subtract an output of the delay line module.

29. A system as in claim 28, wherein the correlation accumulator can be configured to detect when all values of the despread accumulation module are negative for an entire symbol time for early dismissal of the correlation.

30. A system as in claim 24, wherein the despread accumulation module is configured to store an output of the first summing module and an output of the despread accumulation module is configured to act as a feedback signal to the first summing module.

31. A system as in claim 21, wherein the correlation accumulator comprises a second summing module, a correlation accumulation module, and a symbol delay line module.

32. A system as in claim 31, wherein the second summing module comprises a summer configured to add a magnitude of a despread accumulation module output and an output of the symbol delay line module to form N summed symbol time hypotheses.

33. A system as in claim 32 wherein the correlation accumulation module is configured to store the N summed symbol time hypotheses output from the second summing module.

34. A system as in claim 33, wherein the symbol delay line module is configured to send an output of the correlation accumulation module to the second summing module with a delay of N−1 samples.

35. A system as in claim 28, further comprising a control module configured to accept a timing signal from the comparison module comprising a substantially correct symbol timing of the potentially despread signal.

36. A system as in claim 35, further comprising a despread symbol module configured to receive the potentially despread signal from the despread accumulation module.

37. A system as in claim 36, wherein an output of the despread symbol module can be synchronized with an output of the control module to transmit the potentially despread signal using the substantially correct symbol timing.

38. A system as in claim 21, wherein the system for substantially synchronous PN correlation and symbol synchronization can comprise a computer processor coupled with solid state memory.

39. A system as in claim 21, wherein the symbol boundary is not on an epoch of the PN code.

40. A system as in claim 21, wherein each different symbol time hypothesis corresponds to a common PN timing hypothesis.

* * * * *